US006683757B1

(12) United States Patent
Bonin et al.

(10) Patent No.: US 6,683,757 B1
(45) Date of Patent: Jan. 27, 2004

(54) SLIDER-LEVEL MICROACTUATOR FOR PRECISE HEAD POSITIONING

(75) Inventors: Wayne A. Bonin, North Oaks, MN (US); Zine-Eddine Boutaghou, Vadnais Heights, MN (US); Roger L. Hipwell, Jr., Eden Prairie, MN (US); Barry D. Wissman, Eden Prairie, MN (US); Lee Walter, Plymouth, MN (US); Barbara J. Ihlow-Mahrer, Crystal, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 306 days.

(21) Appl. No.: 09/733,351

(22) Filed: Dec. 8, 2000

Related U.S. Application Data

(60) Provisional application No. 60/194,983, filed on Apr. 5, 2000.

(51) Int. Cl.⁷ .............................. G11B 5/56; G11B 21/21
(52) U.S. Cl. .................................. 360/294.3; 360/234.7
(58) Field of Search ........................... 360/294.1, 294.2, 360/294.3, 294.4, 294.5, 294.6, 294.7, 294, 234.7, 234.8

(56) References Cited

U.S. PATENT DOCUMENTS

| | | | |
|---|---|---|---|
| 3,924,268 A | 12/1975 | McIntosh et al. | 360/78 |
| 4,374,402 A | 2/1983 | Blessom et al. | 360/104 |
| 4,605,977 A | * 8/1986 | Matthews | |
| 4,651,242 A | 3/1987 | Hirano et al. | 360/103 |
| 4,764,829 A | 8/1988 | Makino | 360/106 |
| 4,914,725 A | 4/1990 | Belser et al. | 318/560 |
| 5,021,906 A | 6/1991 | Chang et al. | 360/103 |
| 5,034,828 A | 7/1991 | Ananth et al. | 360/75 |
| 5,177,652 A | 1/1993 | Yamaguchi et al. | 360/78.05 |
| 5,189,578 A | 2/1993 | Mori et al. | 360/106 |
| 5,303,105 A | 4/1994 | Jorgenson | 360/106 |

(List continued on next page.)

FOREIGN PATENT DOCUMENTS

| | | |
|---|---|---|
| EP | 0 412 221 B1 | 2/1991 |
| JP | 63-122069 | 5/1988 |
| JP | 02-263369 | 10/1990 |
| JP | 04-134681 | 5/1992 |
| JP | 04-368676 | 12/1992 |
| JP | 05-094682 | 4/1993 |
| JP | 06-020412 | 1/1994 |
| JP | 07-085621 | 3/1995 |

OTHER PUBLICATIONS

"Silicon Micromachined Electromagnetic Microactuators for Rigid Disk Drives" by Tang et al, *IEEE Transactions on Magnetics*, vol. 31, No. 6, pp. 2964–2966 Nov. 1995.
"Magnetic Recording Head Positioning at Very High Track Densities Using a Microactuator-Based, Two-Stage Servo System" by Fan et al., *IEEE Transactions on Industrial Electronics*, vol. 42, No. 3, pp. 222–233 Jun. 1995.

(List continued on next page.)

*Primary Examiner*—Craig A. Renner
(74) *Attorney, Agent, or Firm*—Kinney & Lange, P.A.

(57) ABSTRACT

A microactuator is built at the slider level to achieve high resolution positioning of a transducing head with respect to a track of a rotatable disc having a plurality of concentric tracks in a disc drive system. The slider includes a main body carried by a flexure. A stator portion extends from the main body, and a plurality of beams extend from the stator portion, the beams being flexible in a lateral direction. A rotor portion is connected to the stator portion by the plurality of beams, forming a gap between the stator portion and the rotor portion. The rotor portion carries the transducing head. A plurality of stator electrodes are formed on the stator portion, and a plurality of rotor electrodes are formed on the rotor portion to confront the stator electrodes across the gap. Control circuitry applies selected voltages to the stator electrodes and the rotor electrodes to create a force in the lateral direction for moving the rotor portion with respect to the stator portion of the slider, thereby finely positioning the transducing head.

20 Claims, 15 Drawing Sheets

U.S. PATENT DOCUMENTS

| | | | | |
|---|---|---|---|---|
| 5,325,244 | A | * | 6/1994 | Takano et al. |
| 5,364,742 | A | | 11/1994 | Fan et al. .................. 430/317 |
| 5,375,033 | A | | 12/1994 | MacDonald ............... 361/281 |
| 5,521,778 | A | | 5/1996 | Boutaghou et al. ......... 360/106 |
| 5,657,188 | A | | 8/1997 | Jurgenson et al. .......... 360/106 |
| 5,745,319 | A | | 4/1998 | Takekado et al. ........ 360/78.05 |
| 5,764,432 | A | * | 6/1998 | Kasahara |
| 5,764,444 | A | | 6/1998 | Imamura et al. ............. 360/109 |
| 5,781,381 | A | | 7/1998 | Koganezawa et al. ...... 360/106 |
| 5,796,558 | A | | 8/1998 | Hanrahan et al. ........... 360/106 |
| 5,801,472 | A | | 9/1998 | Wada et al. ................ 310/309 |
| 5,805,375 | A | | 9/1998 | Fan et al. ................. 360/78.12 |
| 5,856,896 | A | | 1/1999 | Berg et al. .................. 360/104 |
| 5,867,347 | A | | 2/1999 | Knight et al. ............... 360/104 |
| 5,896,246 | A | | 4/1999 | Budde et al. ............... 360/104 |
| 5,898,541 | A | | 4/1999 | Boutaghou et al. ......... 360/109 |
| 5,898,544 | A | | 4/1999 | Krinke et al. ............... 360/104 |
| 5,920,441 | A | | 7/1999 | Cunningham et al. ... 360/78.05 |
| 5,920,978 | A | * | 7/1999 | Koshikawa et al. |
| 5,936,805 | A | | 8/1999 | Imaino ....................... 360/104 |
| 5,943,189 | A | * | 8/1999 | Boutaghou et al. |
| 5,959,808 | A | | 9/1999 | Fan et al. .................... 360/106 |
| 6,249,402 | B1 | * | 6/2001 | Katayama ................ 360/234.7 |
| 6,362,542 | B1 | * | 3/2002 | Novotny |

OTHER PUBLICATIONS

"A Flexural Piggyback Milli–Actuator for Over 5 Gbit/in$^2$ Density Magnetic Recording" by Koganezawa et al, *IEEE Transactions on Magnetics*, vol. 32, No. 5, pp. 3908–3910 Sep. 1996.

"Transverse Mode Electrostatic Microactuator for MEMS–Based HDD Slider" by Imamura et al, *IEEE* pp. 216–221 1996.

"An Experiment for Head Positioning System Using Sub-micron Track–width GMR Head" by Yoshikawa et al., *IEEE Transactions on Magnetics*, vol. 32, No. 5, pp. 3905–3907 Sep. 1996.

"Micro Electrostatic Actuators in Dual–Stage Disk Drives with High Track Density" by Tang et al., *IEEE Transactions on Magnetics*, vol. 32, No. 5, pp. 3851–3853 Sep. 1996.

"Piezoelectric Microactuator Compensating for Off–Track Errors in Magnetic Disk Drives" by Imamura et al, *ASME Advance Information Storage Systems*, vol. 5, pp 119–125, 1993.

"A Dual–Stage Magnetic Disk Drive Actuator Using a Piezoelectric Device for a High Track Density" by Mori et al., *IEEE Transactions on Magnetics*, vol. 27, No. 6, pp. 5298–5300 Nov. 1991.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, pp. 5079–5081 Nov. 1991.

"Design, Fabrication, and Testing of Silicon Microgimbals for Super–Compact Rigid Disk Drives" by Temesvary et al., *Journal of Microelectromechanical Systems*, vol. 4, No. 1, pp. 18–27 Mar. 1995.

Application No. 09/007,007, Filed Jan. 14, 1998, Entitled: Piezoelectric Microactuator for Precise Head Positioning, Inventor: Vlad Joseph Novotny, Attorney Docket No.: 169.12–0345.

* cited by examiner

US 6,683,757 B1

SLIDER-LEVEL MICROACTUATOR FOR PRECISE HEAD POSITIONING

CROSS-REFERENCE TO RELATED APPLICATION(S)

This application claims priority from Provisional Application No. 60/194,983 filed Apr. 5, 2000 for "Transducer-Level Electrostatic Linear Microactuator by W. Bonin, Z. Boutaghou, R. Hipwell, Jr. and B. Wissman.

INCORPORATION BY REFERENCE

The aforementioned Provisional Application No. 60/194,983 is hereby incorporated by reference.

BACKGROUND OF THE INVENTION

The present invention relates to a disc drive microactuator, and more particularly to a high resolution positioning mechanism implemented at the slider level for selectively moving a transducer portion of the slider radially with respect to circumferential data tracks of a rotatable disc.

The density of concentric data tracks on magnetic discs continues to increase (that is, the size of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising approach for high resolution head positioning involves employing a high resolution microactuator in addition to the conventional lower resolution actuator motor, thereby effecting head positioning through dual-stage actuation. Various microactuator designs have been considered to accomplish high resolution head positioning. Some designs are employed to deform disc drive components such as the actuator arm or the flexure in order to achieve minute displacements by bending. Other designs introduce a separate microactuator component at an interface between disc drive components. While many previous microactuator designs are able to deliver satisfactory micropositioning performance, their effectiveness is inherently limited by the sheer mass that the microactuators are designed to move. In order to move or bend one or more of the disc drive components, the microactuator employed must provide a relatively large amount of force, which requires either a complex or relatively massive microactuator motor mechanism.

A microactuator designed to move only a transducer-carrying portion of the slider with respect to the main portion of the slider is disclosed in U.S. application No. 09/007,007 which is assigned to Seagate Technology, Inc., the same assignee as the present invention. The present invention provides another microactuator for moving a transducer-carrying portion of the slider with high resolution and frequency response, in a configuration that is readily and inexpensively manufactured by thin-film processing techniques.

BRIEF SUMMARY OF THE INVENTION

The present invention is a microactuator built at the slider level for achieving high resolution positioning of a transducing head with respect to a track of a rotatable disc having a plurality of concentric tracks in a disc drive system. The slider includes a main body carried by a flexure. A stator portion extends from the main body, and a plurality of beams extend from the stator portion, the beams being flexible in a lateral direction. A rotor portion is connected to the stator portion by the plurality of beams, forming a gap between the stator portion and the rotor portion. The rotor portion carries the transducing head. A plurality of stator electrodes are formed on the stator portion, and a plurality of rotor electrodes are formed on the rotor portion to confront the stator electrodes across the gap. Control circuitry applies selected voltages to the stator electrodes and the rotor electrodes to create a force in the lateral direction for moving the rotor portion with respect to the stator portion of the slider, thereby finely positioning the transducing head.

DETAILED DESCRIPTION OF THE PREFERRED EMBODIMENTS

Figure 1:
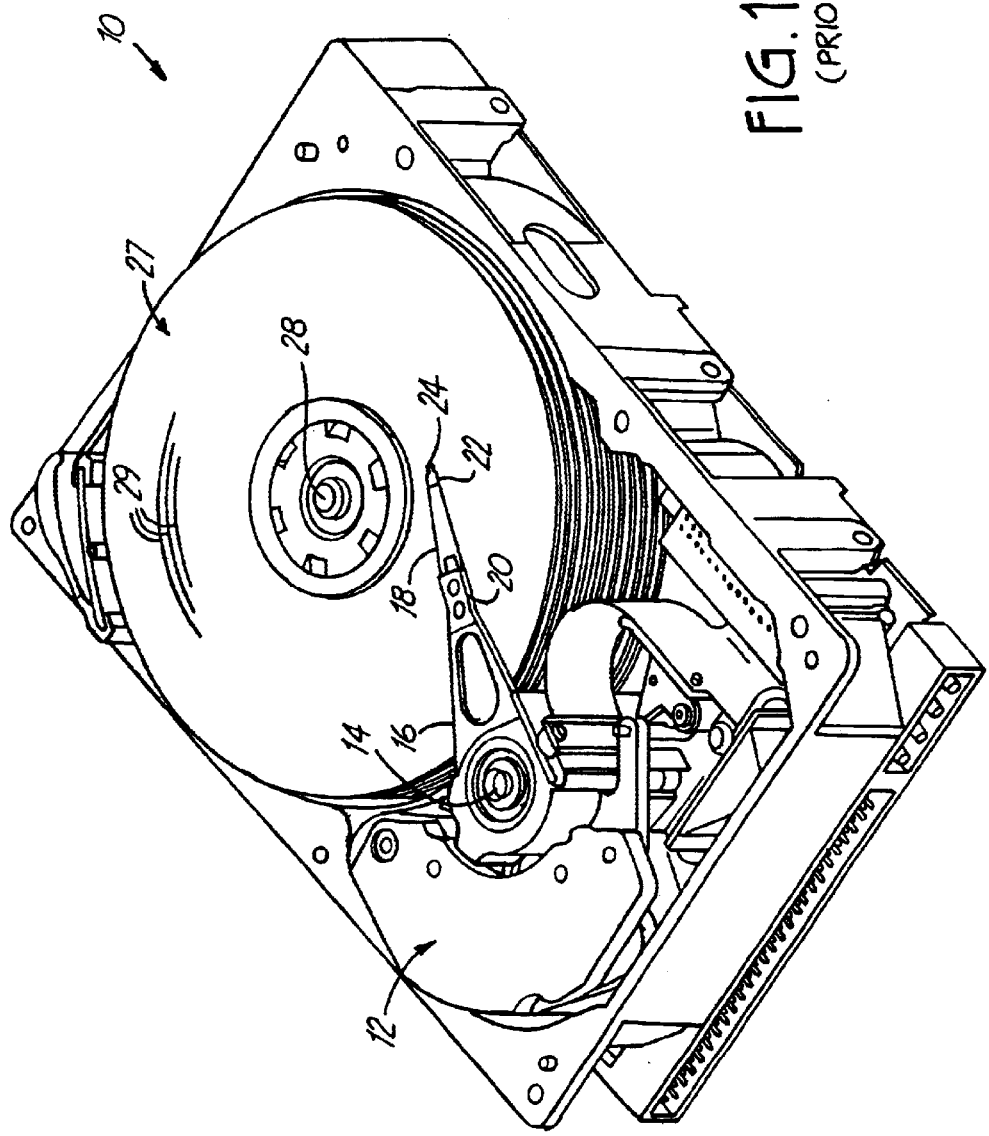
FIG. 1 is a perspective view of a disc drive including an actuation system for positioning a slider over tracks of a disc.

FIG. 1 is a perspective view of a prior art disc drive actuation system 10. Actuation system 10 includes voice coil motor (VCM) 12 arranged to rotate actuator arm 16 on a spindle around axis 14. Head suspension 18 is connected to actuator arm 16 at head mounting block 20. Flexure 22 is connected to an end of head suspension 18, and carries slider 24. Slider 24 carries a transducing head (not shown in FIG. 1) for reading and/or writing data on disc 27, which rotates around axis 28 and includes concentric tracks 29 on which the data is written. As disc 27 rotates, windage is encountered by slider 24 to keep it aloft a small distance above the surface of disc 27.

VCM 12 is selectively operated to move actuator arm 16 around axis 14, thereby moving slider 24 between tracks 29 of disc 27. However, for disc drive systems with high track density, VCM 12 lacks sufficient resolution and frequency response to position a transducing head on slider 24 precisely over a selected track of disc 27. Therefore, a higher resolution actuation device is necessary.

Figure 2:
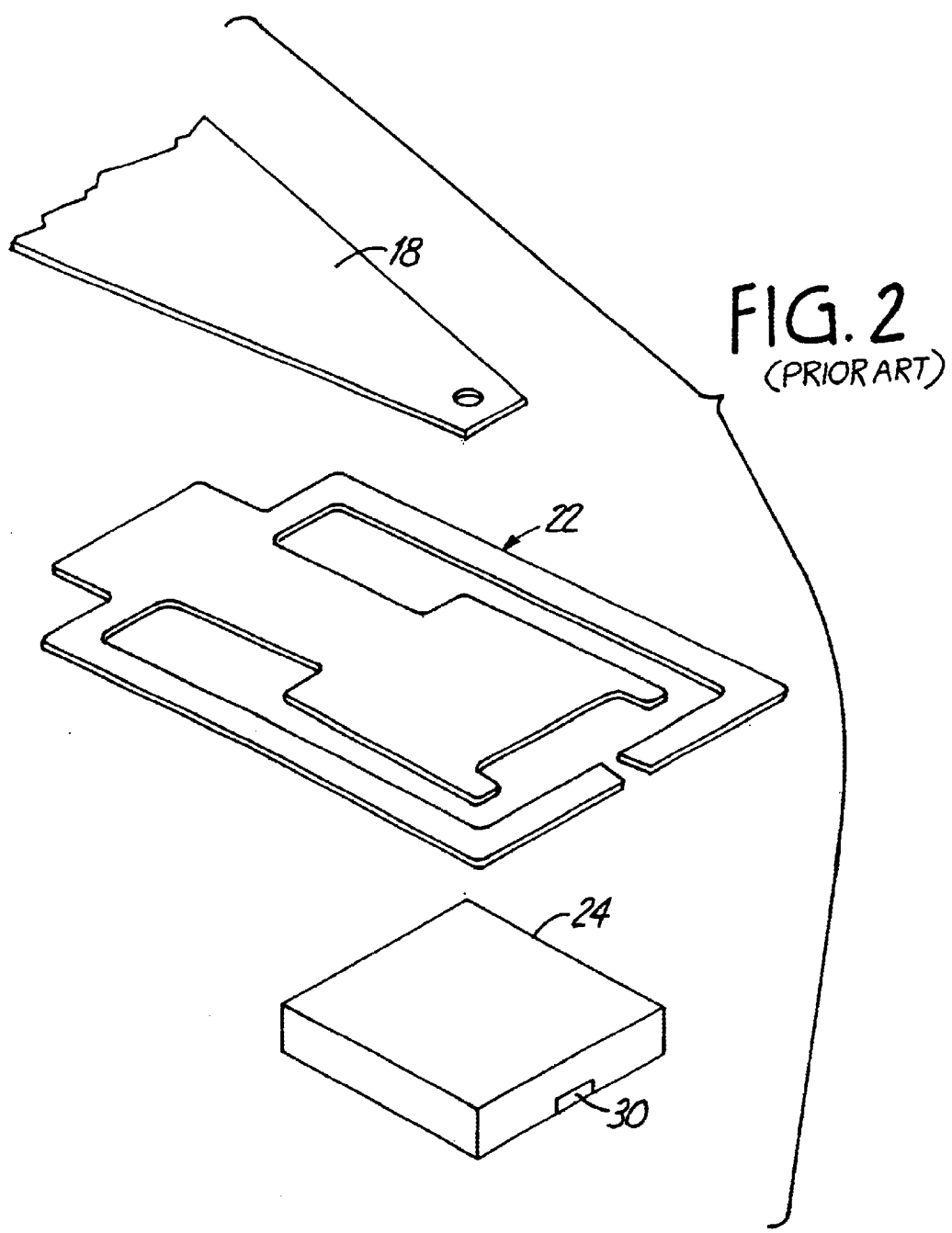
FIG. 2 is a perspective view of a typical flexure and slider arrangement in a disc drive.

FIG. 2 is an exploded perspective view of a portion of the prior art disc drive, showing flexure 22 attached to suspension 18 and supporting slider 24 above a surface of disc 27 (FIG. 1). Transducing head 30 is carried by slider 24 to transduce data with the disc. In operation of the disc drive, suspension 18, flexure 22 and slider 24 are all moved together as coarse positioning is performed by VCM 12 (FIG. 1) moving actuator arm 16 (FIG. 1) to which load beam 18 is attached.

Figure 3:
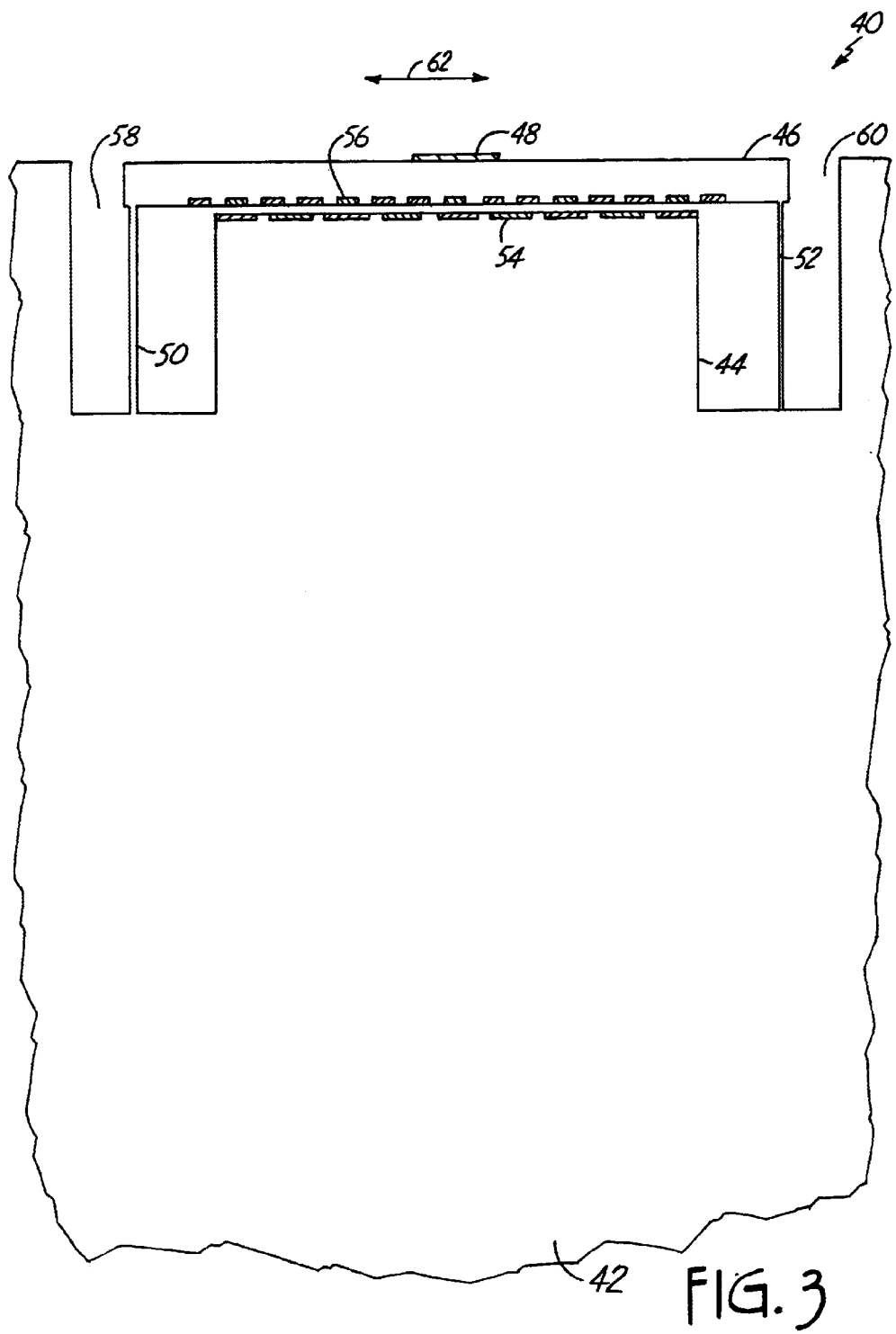
FIG. 3 is a top sectional view of a slider employing a slider-level microactuator according to the present invention.

FIG. 3 is a top sectional view of slider 40 employing a slider-level microactuator according to the present invention (slider 40 of the present invention replaces prior art slider 24 shown in FIG. 2) Slider 40 includes main body 42, stator portion 44, rotor portion 46 carrying transducing head 48, beams 50 and 52, stator electrodes 54 and rotor electrodes 56. Main body 42 of slider 40 is formed with apertures 58 and 60 on opposite sides of stator portion 44. Beams 50 and 52 extend from main body 42 in respective apertures 58 and 60 to connect to rotor portion 46. Beams 50 and 52 are flexible in the lateral direction (designated by arrows 62) to enable lateral movement of rotor portion 46, and thus transducing head 48, with respect to stator portion 44.

In order to operate the microactuator shown in FIG. 3, a voltage difference is applied between stator electrodes 54 and rotor electrodes 56. This voltage difference creates an electrostatic force of attraction, normal to the lateral direction of arrows 62, and also produces a lateral electrostatic force in the direction of arrows 62. The lateral electrostatic force $F_{lat}$ is given by:

$$F_{lat} = N \frac{\varepsilon_0 L_e}{2 L_g} V^2 \qquad (\text{Eq. 1})$$

where N is the number of electrically active electrodes, $\epsilon_0$ is the dielectric constant of free space or air ($8.854 \times 10^{-12}$ Farads per meter (F/m)), $L_e$ is the length of the electrodes in meters, $L_g$ is the size of the gap between stator electrodes 54 and rotor electrodes 56 in meters, and V is the voltage difference between stator electrodes 54 and rotor electrodes 56. The normal electrostatic force $F_{norm}$, attempting to pull rotor portion 46 and stator portion 44 together, is given by:

$$F_{norm} = N \frac{\varepsilon_0 L_e W_e}{2 L_g^2} V^2 \qquad (\text{Eq. 2})$$

where N is the number of electrically active electrodes, $\epsilon_0$ is the dielectric constant of free space or air ($8.854 \times 10^{-12}$ Farads per meter (F/m)), $L_e$ is the length of the electrodes in meters, $W_e$ is the width of the electrodes in meters, $L_g$ is the size of the gap between stator electrodes 54 and rotor electrodes 56 in meters, and V is the voltage difference between stator electrodes 54 and rotor electrodes 56. Therefore, the ratio of the desired lateral force to the potentially problematic normal force is given by:

$$\frac{F_{lat}}{F_{norm}} = \frac{L_g}{W_e}. \qquad (\text{Eq. 3})$$

In an exemplary embodiment, the gap between stator electrodes 54 and rotor electrodes 56 is about 1 micro-meter ($\mu$m). Since the lateral electrostatic force utilized to move rotor portion 46 is inversely proportional to the size of the gap, a small gap size is desired. Also, in an exemplary embodiment, the width of stator electrodes 54 is about 3 $\mu$m, at a 4 $\mu$m pitch (that is, there is a 1 $\mu$m insulative space between the electrodes), and the width of rotor electrodes 56 is about 1.67 $\mu$m at a 2.67 $\mu$m pitch (again, there is a 1 $\mu$m insulative space between the electrodes). The desired lateral electrostatic force is proportional to the number of electrodes, as long as the width of the electrodes is larger than the size of the gap between stator portion 44 and rotor portion 46. As the electrode width becomes too small compared to the size of the gap, the lateral electrostatic force will decrease due to fringing field effects.

For the exemplary embodiment where the gap is 1 $\mu$m and the electrode width is 3 $\mu$m, the lateral electrostatic force produced by the microactuator is about one-third of the normal electrostatic force produced. A relatively simple mechanism can be designed to permit lateral motion of rotor portion 46 without allowing rotor portion 46 to move closer to stator portion 44. For example, as shown in FIG. 3, beams 50 and 52 are provided to connect rotor portion 46 to main body 42 of slider 40. Beams 50 and 52 are flexible in the lateral direction, but are highly resistant to normal motions tending to move rotor portion 46 and stator portion 44 closer together.

Figure 4:
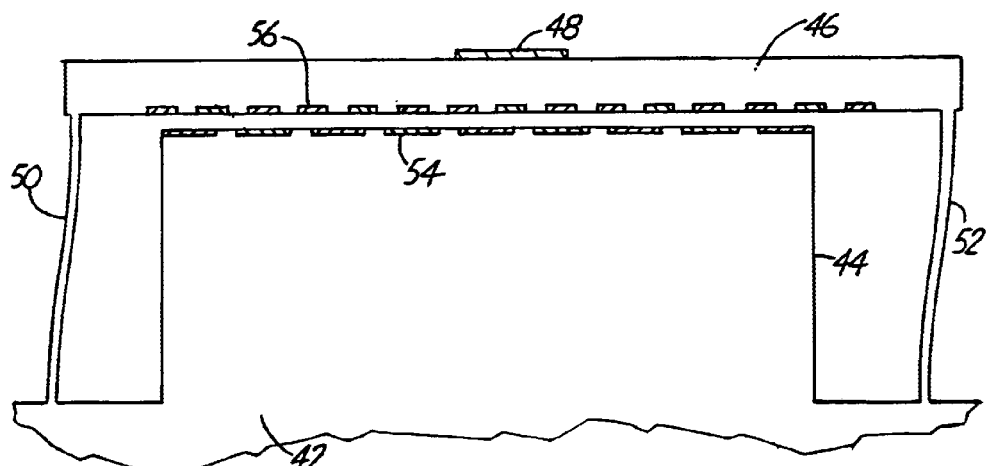
FIG. 4 is a top sectional view illustrating the slider of the present invention having a microactuator deflected by one step.

FIG. 4 is a top sectional view illustrating the slider 40 with the microactuator configured to deflect rotor portion 46, carrying transducing head 48, one step to the right. Differential voltages are applied between selected ones of stator electrodes 54 and rotor electrodes 56 to cause a lateral force therebetween.

Figure 5:
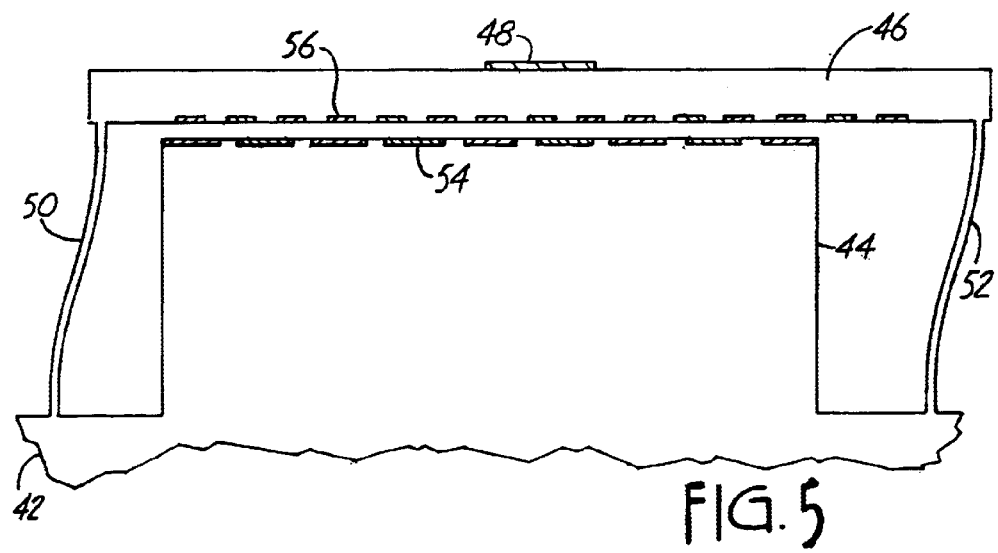
FIG. 5 is a top sectional view illustrating the slider of the present invention having a microactuator deflected by two steps.
Figure 6:
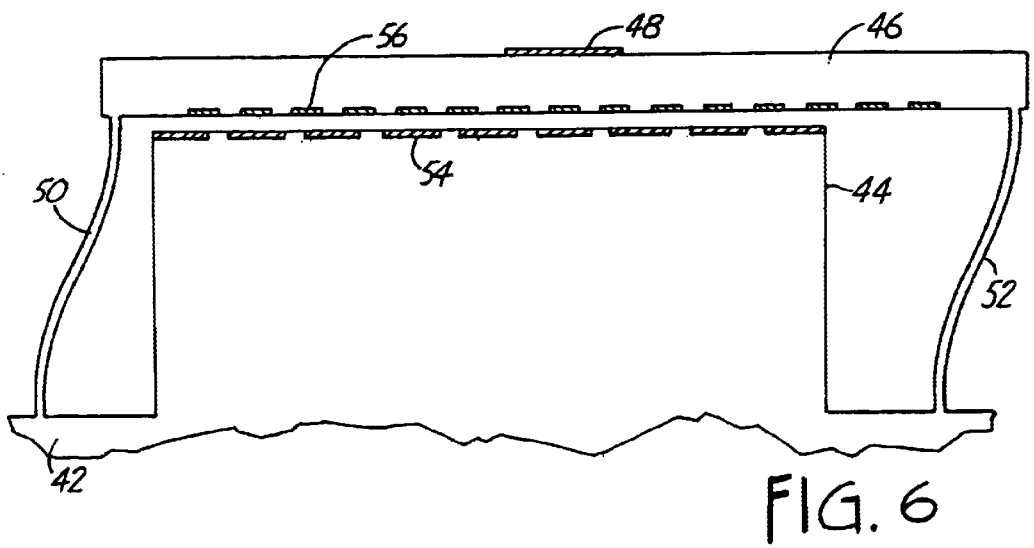
FIG. 6 is a top sectional view illustrating the slider of the present invention having a microactuator deflected by three steps.

Since stator portion 44 of slider 40 is fixedly attached to slider body 42, the lateral force between stator electrodes 54 and rotor electrodes 56 induces a lateral movement of rotor portion 46 with respect to stator portion 44. Beams 50 and 52 bend in order to accommodate the lateral movement of rotor portion 46 dictated by the lateral movement of rotor electrodes 56 with respect to stator electrodes 54. Similarly, FIG. 5 is a top sectional view illustrating slider 40 with the microactuator configured to deflect rotor portion 46 two steps to the right, and FIG. 6 is a top sectional view illustrating slider 40 with the microactuator configured to deflect rotor portion 46 three steps to the right. As shown in FIGS. 5 and 6, beams 50 and 52 bend further to accommodate the further lateral movement of rotor portion 46 for greater displacement of transducing head 48.

Figure 7A:
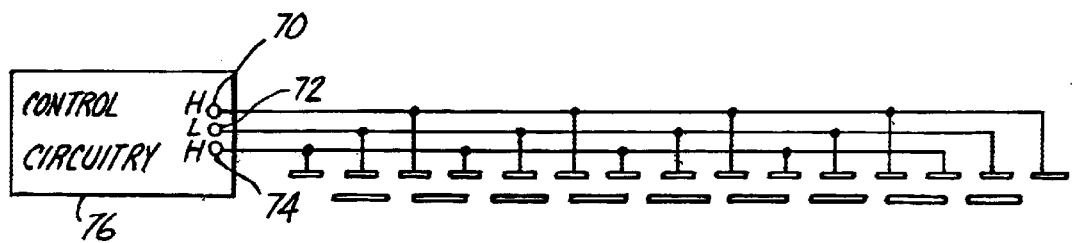
FIGS. 7A–7G are schematic diagrams of the progressive deflection steps of the microactuator of the present invention.
Figure 7B:
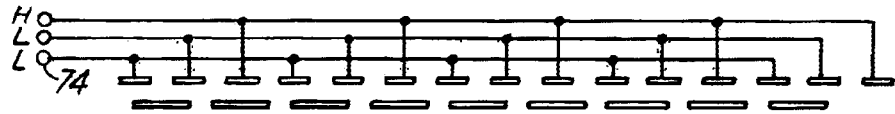
Figure 7C:
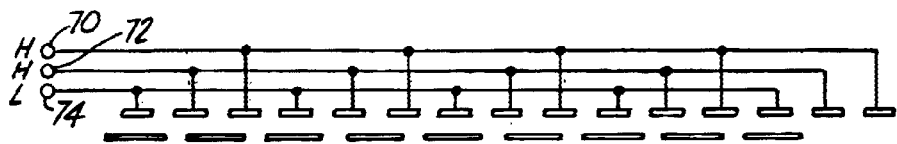
Figure 7D:
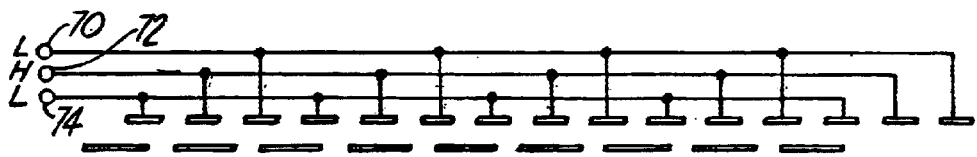
Figure 7E:
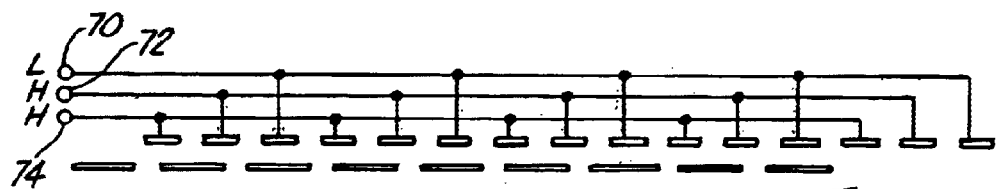
Figure 7F:
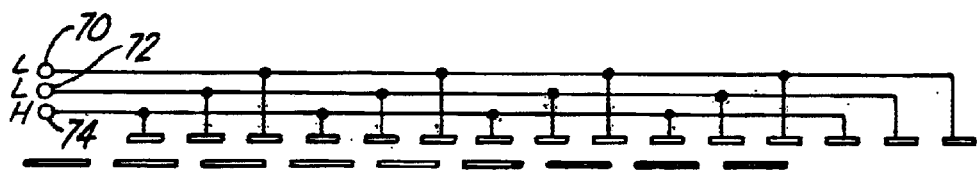

Control of the microactuator movement may be accomplished in a digital, step-wise manner, or in a smooth continuum by analog control. The connections of rotor electrodes 56 for each progressive microactuation step are shown in FIGS. 7A–7G, with stator electrodes 54 being fixedly connected alternately to high and low sources of potential. Rotor electrodes 56 are alternately connected to terminals 70, 72 and 74, the voltages of which are controlled by appropriate control circuitry 76. FIG. 7A shows the quiescent position of the microactuator, in which rotor electrodes 56 connected to terminal 70 are at a high potential, rotor electrodes 56 connected to terminal 72 are at a low potential, and rotor electrodes 56 connected to terminal 74 are at a high potential. The potentials applied to terminals 70, 72 and 74 are then adjusted by control circuitry 76 (shown only in FIG. 7A, for simplicity) in either a gradual or a step-wise manner through a plurality of phases, shown in FIGS. 7B–7G. The first phase is shown in FIG. 7B, where the voltage applied to terminal 74 is shifted low, while the voltage applied to terminal 70 remains high and the voltage applied to terminal 72 remains low. As a result, a lateral force is exerted on rotor electrodes 56, causing rotor electrodes to be displaced one step to the right with respect to stator electrodes 54.

Figure 7G:

Similarly, the second, third, fourth and fifth phases of actuation are shown in respective FIGS. 7C, 7D, 7E and 7F, and the return to tile initial (quiescent) phase is shown in FIG. 7G, with rotor electrodes 56 actuated six steps. The voltages applied to terminals 70, 72 and 74 are adjusted to cause lateral forces to be exerted on rotor electrodes 56 and achieve further displacement of rotor electrodes 56 with respect to stator electrodes 54. For simplicity, the voltages applied for each actuation phase are listed in the table below:

TABLE 1

|  | Terminal 70 | Terminal 72 | Terminal 74 |
|---|---|---|---|
| Quiescent | HIGH | LOW | HIGH |
| Phase 1 | HIGH | LOW | LOW |
| Phase 2 | HIGH | HIGH | LOW |
| Phase 3 | LOW | HIGH | LOW |
| Phase 4 | LOW | HIGH | HIGH |
| Phase 5 | LOW | LOW | HIGH |
| Quiescent (Phase 6) | HIGH | LOW | HIGH |

Each actuation step displaces rotor electrodes 56 by an amount equal to one-third of the pitch of stator electrodes 54. Thus, one complete cycle of actuation displaces rotor electrodes 56 by an amount equal to twice the pitch of stator electrodes 54. Following the actuation steps in the opposite order achieves displacement of rotor electrodes 56 in the opposite direction. In this manner, lateral displacements on the order of 10 micro-meters ($\mu$m) or more are readily achievable by the microactuator of the present invention.

Although the microactuator has been shown and described with fixed potentials connected to stator electrodes 54 and with switched potentials connected to rotor electrodes 56, it should be understood that the electrodes could be reversed, so that the fixed potentials are connected to rotor electrodes 56 and the switched potentials are connected to stator electrodes 54. With such a modified configuration, the number of leads needed for connections to the rotor may be reduced, if the driver chip controlling the microactuator is either integrated into main body 42 of slider 40 or is connected to slider 40 from the disc drive suspension and/or flex circuit supporting slider 40. In addition, the fixed potential connected to rotor electrodes 56 shields transducing head 48 from noise generated by switching the phase voltages, reducing the need for additional shielding between the microactuator and the head.

In order to implement the microactuator shown in FIG. 3 and achieve the type of performance shown in FIGS. 4–6, several design consideration must be taken into account. Rotor portion 46 must be stiff enough to resist bending due to the normal electrostatic attractive force between rotor portion 46 and stator portion 44, to prevent rotor portion 46 and stator portion 44 from contacting one another. Since the normal force between rotor portion 46 and stator portion 44 is proportional to the reciprocal of the square of the gap distance, deflection of rotor portion 46 toward stator portion 44 by more than one-third of the original gap distance would cause a positive feedback relationship between the force and the gap distance, forcing rotor portion 46 to snap into contact with stator portion 44 and a preventing any lateral motion of the microactuator. In an exemplary embodiment, rotor portion 46 is composed of $Al_2O_3$, having an elastic modulus of 530 giga-Pascals (GPa). At 80 Volts with a gap distance of 1.0 $\mu$m, the normal force between rotor portion 46 and stator portion 44 is approximately 1.3 milli-Newtons (mN). This force causes a deflection of less than 0.05 $\mu$m when rotor portion 46 has a thickness of 10 $\mu$m, and even less for greater thickness of rotor portion 46. Such deflections are acceptable, and do not degrade the performance of the microactuator.

Rotor portion 46 may also be deflected toward stator portion 44 by compression of beams 50 and 52 normal to the gap between rotor portion 46 and stator portion 44. In an exemplary embodiment, beams 50 and 52 have a length of 250 $\mu$m, a width of 2 $\mu$m, and are composed of silicon with an elastic modulus of 160 GPa. In this configuration, the normal force of 1.3 mN causes compression stress in beams 50 and 52 of 1.3 mega-Pascals (MPa), which reduces the length of the beams (and thus the spacing between rotor portion 46 and stator portion 44) by 0.002 $\mu$m. This compression is acceptable, and does not degrade the performance of the microactuator.

Buckling of beams 50 and 52 under the forces applied thereto is another characteristic which must be considered. The critical buckling load for an embodiment where beams 50 and 52 are composed of silicon and have a length of 250 $\mu$m and a width of 2 $\mu$m is about 33.6 mN, which is about 26 times greater than the expected force generated at 80 Volts. Therefore, buckling is not a problem for the exemplary design of the present invention.

As beams 50 and 52 bend during lateral deflection of rotor portion 46 with respect to stator portion 44, their effective length controlling the size of the gap between rotor portion 46 and stator portion 44 is reduced (although their actual length as determined by integrating along the curved shape of the beam remains constant). The bending of beams 50 and 52 can be roughly modeled as strings in tension, remaining generally straight and pivoting at the ends. The change in the dimension of the gap (dy) for a given lateral motion (dx) is given by the following:

$$dy = L - \sqrt{L^2 - (dx)^2} \qquad (Eq.4)$$

where L is the effective length of beams 50 and 52. The effective length of beams 50 and 52 is approximately 75% of the actual length of beams 50 and 52, or (0.75)(250 $\mu$m)=167.5 $\mu$m. The effective shortening (dy) for lateral deflections (dx) from 0.5 $\mu$m to 50 $\mu$m and beam lengths of 125 $\mu$m, 250 $\mu$m and 500 $\mu$m are shown in the table below:

TABLE 2

| dx ($\mu$m) | dy ($\mu$m), beam length = 125 $\mu$m | dy ($\mu$m), beam length = 250 $\mu$m | dy ($\mu$m), beam length = 500 $\mu$m |
|---|---|---|---|
| 0.5 | 0.00133 | 0.000667 | 0.000333 |
| 1.0 | 0.00533 | 0.00267 | 0.00133 |
| 2.0 | 0.0213 | 0.0107 | 0.00533 |
| 3.0 | 0.0480 | 0.0240 | 0.0120 |
| 5.0 | 0.133 | 0.0667 | 0.0333 |
| 7.0 | 0.262 | 0.131 | 0.0653 |
| 10.0 | 0.535 | 0.267 | 0.133 |
| 15.0 | 1.21 | 0.601 | 0.300 |
| 20.0 | 2.16 | 1.07 | 0.534 |
| 30.0 | 4.93 | 2.42 | 1.20 |
| 50.0 | 14.4 | 6.79 | 3.35 |

In view of the table above, and assuming a maximum tolerable gap reduction (dy) of one-third of the nominal 1 $\mu$m gap, or about 0.33 $\mu$m gap reduction, a maximum lateral deflection (dx) is about 7.0 $\mu$m for a 125 $\mu$m beam, about 10.0 $\mu$m for a 250 $\mu$m beam, and about 15 $\mu$m for a 500 $\mu$m beam. The effective shortening of the beams is therefore one of the primary limiting factors on the total achievable stroke of the microactuator, but still does enable significant and usable lateral deflections.

The potential for lateral instability due to the lateral component of normal force between rotor electrodes 56 and stator electrodes 54 must also be accounted for by the microactuator design. At large lateral displacements, the angle of beams 50 and 52 away from the normal axis results in a component of the normal attractive force between rotor portion 46 and stator portion 44 being resolved into the lateral direction. It this lateral force component becomes greater than the sum of the beam spring force and the lateral electrostatic force, rotor portion 46 will move uncontrollably in the lateral direction until it is restrained by contacting something. The lateral component of the normal force of attraction is equal to the normal force multiplied by the ratio of the lateral deflection of rotor portion 46 to the length of beams 50 and 52. For a 10 $\mu$m lateral deflection of rotor portion 46 and a 125 $\mu$m length of beams 50 and 52, the size of the gap between rotor portion 46 and stator portion 44 is reduced to about 0.5 $\mu$m, or about half of the nominal 1.0 $\mu$m gap size. This reduced gap size doubles the lateral electrostatic force to 877 $\mu$N, and quadruples the normal electrostatic force to 5.2 mN. The lateral component of the normal force is thus 5.2 mN multiplied by the ratio of lateral deflection (10 $\mu$m) to beam length (125 $\mu$m), yielding a lateral component of normal force equal to 416 $\mu$N. This is much less than the 877 $\mu$N of lateral electrostatic holding force that is exerted on rotor portion 46. Therefore, for this exemplary configuration, lateral instability problems are avoided. Increasing the length of beams 50 and 52 further reduces the lateral component of the normal attraction force, resulting in even less lateral instability.

The spring constants of beams 50 and 52 must also be selected to permit the maximum lateral deflection and resonant frequency desired for the microactuator design. The maximum lateral deflection and resonant frequency of the microactuator is affected by the voltage applied between stator electrodes 54 and rotor electrodes 56 (and thus the lateral force applied by the microactuator), the spring constant of beams 50 and 52, and the mass of rotor portion 46. For example, at a voltage of 80 Volts, the lateral force of the microactuator is 438 $\mu$N, and thus the maximum spring constant for 10 $\mu$m of travel is 438 divided by 10, or 43.8 N/m. If the same travel is desired at a drive level of 40 Volts, the maximum spring constant is four times less, or 11.0 N/m. The mass of rotor portion 46 is typically defined by its volume, which in an exemplary embodiment is equal to its 250 $\mu$m width (parallel to the gap) multiplied by its 250 $\mu$m thickness (perpendicular to the air-bearing surface of slider 40) multiplied by its 10 $\mu$m length (perpendicular to the gap), or 6.25×10$^{-13}$ m$^3$. For an exemplary material such as Al$_2$O$_3$, which has a density of 4000 kilograms per cubic meter (kg/m$^3$), the mass of rotor portion 46 is about 2.5 $\mu$g. With a length of 50 $\mu$m rather than 10 $\mu$m, the mass increases to 12.5 $\mu$g. The resonant frequencies of the microactuator for various masses of rotor portion 46 (corresponding to various lengths of rotor portion 46), drive voltages and spring constants, assuming ±10 $\mu$m of maximum lateral deflection, are given in Table 3.

TABLE 3

| Mass | 20 Volts, 2.7 N/m spring constant | 40 Volts, 11.0 N/m spring constant | 80 Volts, 43.8 N/m spring constant |
|---|---|---|---|
| 2.5 $\mu$g | 5269 Hertz | 10,557 Hertz | 21,066 Hertz |
| 5.0 $\mu$g | 3726 Hz | 7465 Hz | 14,896 Hz |
| 12.5 $\mu$g | 2356 Hz | 4721 Hz | 9421 Hz |

If the desired maximum lateral deflection is only ±2.5 $\mu$m rather than ±10 $\mu$m, the spring constants can be four times greater and the resonant frequencies listed in Table 3 will be doubled.

Figure 8:
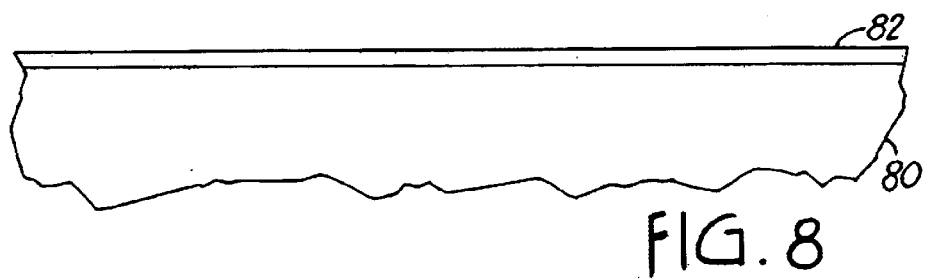
FIGS. 8–25 are section views illustrating a process of fabricating the slider and microactuator according to the present invention.
Figure 9:
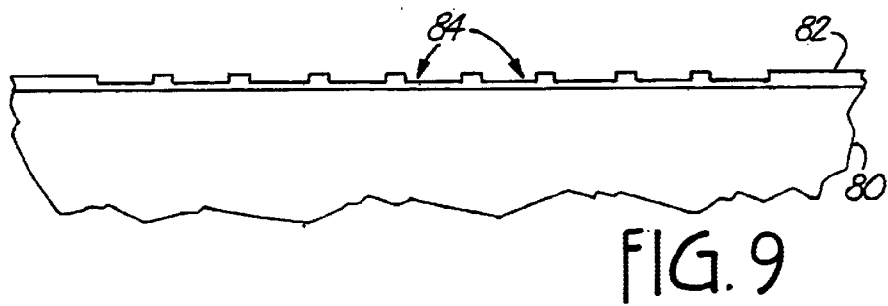

The microactuator utilized in slider 40, as depicted in FIGS. 3–6, is preferably fabricated according to a novel procedure shown in FIGS. 8–25. FIG. 8 is a section view of the initial configuration of substrate water 80 from which slider 40 is to be formed. Insulating layer 82 is deposited on wafer 80 with a thickness of approximately 1 $\mu$m. Wafer 80 is a typical substrate material such as silicon, while insulating layer 82 may be composed of silicon nitride, aluminum oxide, or another insulating material. FIG. 9 is a section view depicting the subsequent fabrication step, in which slots 84 are etched into insulating layer 82, with a thickness of one-fourth to one-half of the thickness of insulating layer 82. Slots 84 will define the location of stator electrodes 54 (FIG. 3).

Figure 10:
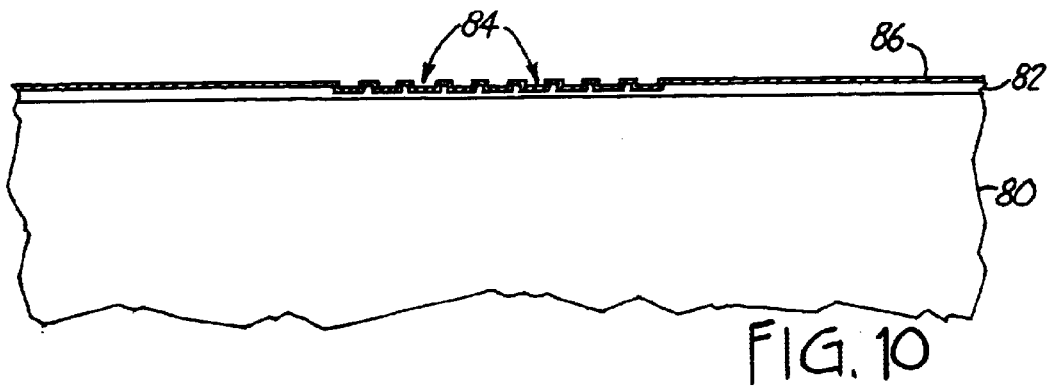
Figure 11:
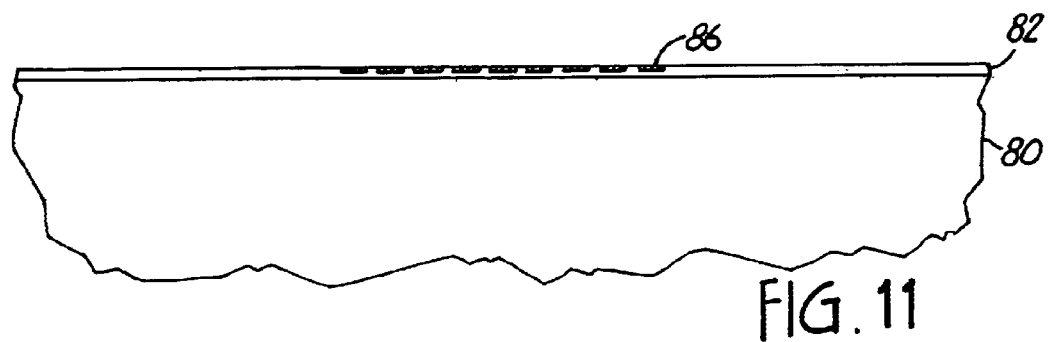

FIG. 10 is a section view illustrating stator electrode metallization layer 86 deposited on insulating layer 82. As is further shown in FIG. 11, a planarization process is performed to define the stator electrode features (stator electrodes 54, FIG. 3) from electrode metallization layer 86. The resulting structure includes insulating layer 82 and features of electrode metallization layer 86 defining a planar top surface. Planarization may be achieved by a number of methods known in the art, such as by lapping or chemical mechanical polishing (CMP), for example.

Figure 12:
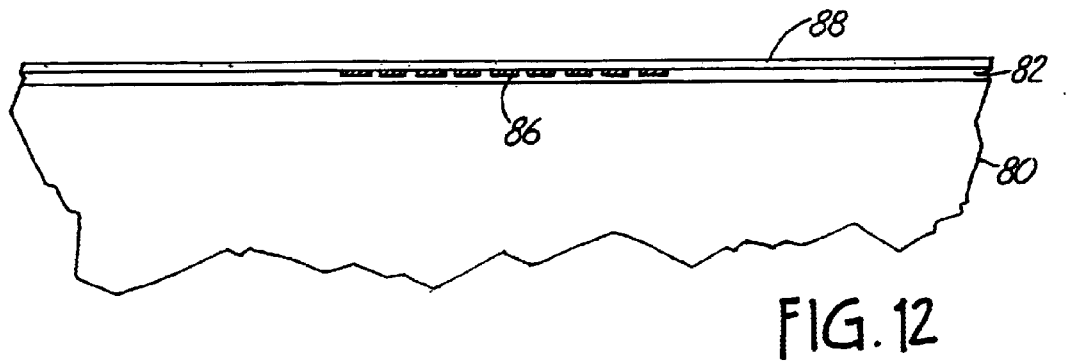
Figure 13:
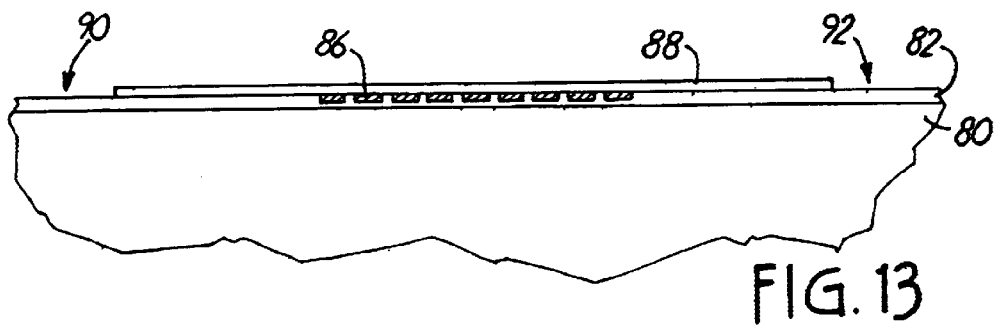

FIG. 12 is a section view illustrating phosplhosilicate glass (PSG) spacer layer 88 deposited over the planar top surface of insulating layer 82 and the features of electrode metallization layer 86. Spacer layer 88 is a sacrificial layer, and in a preferred embodiment has a thickness of about 1 $\mu$m (corresponding to the desired gap size between the stator electrodes and the rotor electrodes of the microactuator). As is further shown in FIG. 13, spacer layer 88 is subsequently removed from outer regions 90 and 92 of the device.

Figure 14:
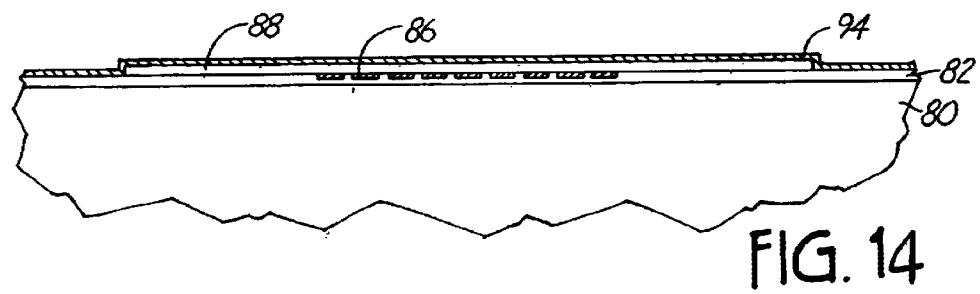
Figure 15:
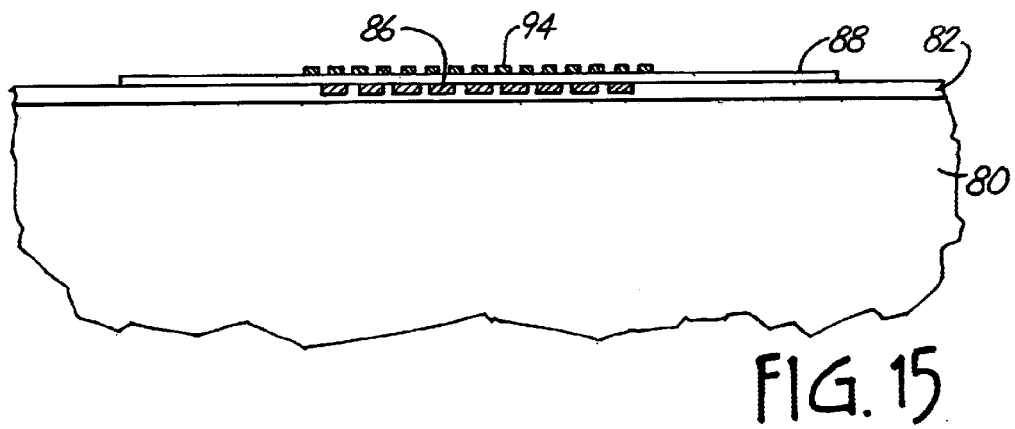

FIG. 14 is a section view illustrating rotor electrode metallization layer 94 deposited over insulating layer 82 and spacer layer 88. As is further shown in FIG. 15, high resolution etching is subsequently performed on the device to define the rotor electrode features (rotor electrodes 56, FIG. 3) from electrode metallization layer 94. The resulting structure includes rotor electrode features and stator electrode features separated by spacer layer 88.

Figure 16:
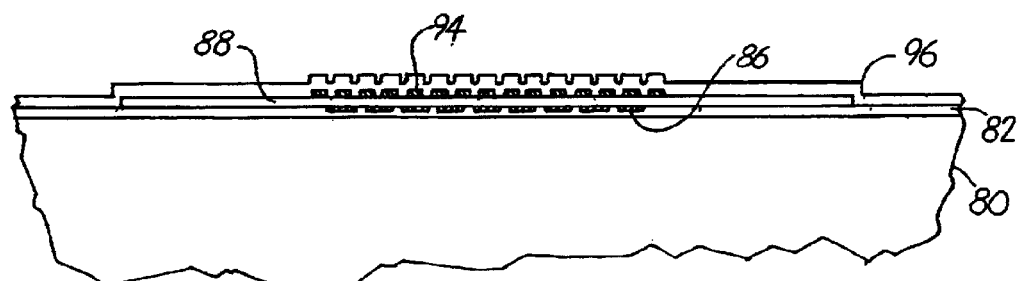
Figure 17:
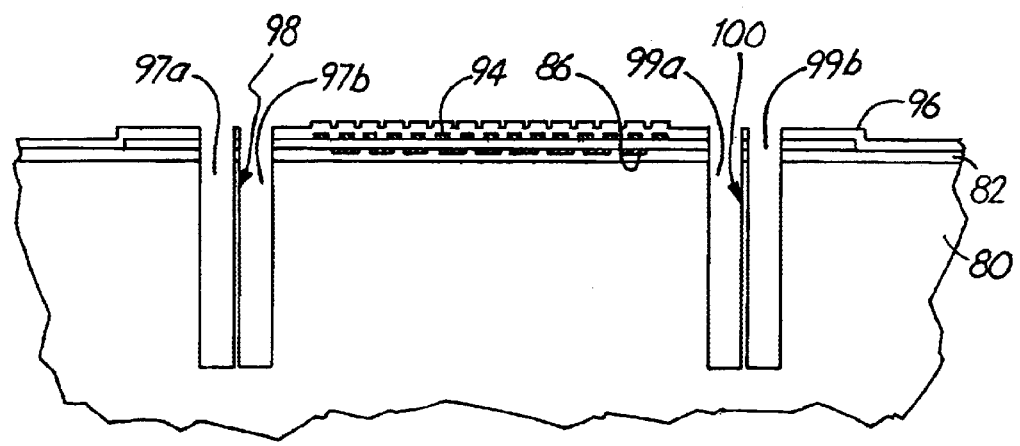

FIG. 16 is a section view illustrating insulating layer 96 deposited over insulating layer 82, spacer layer 88 and the rotor electrode features of the electrode metallization layer 94. As is further shown in FIG. 17, trenches 97*a*, 97*b*, 99*a* and 99*b* are subsequently etched in the resulting structure to form beam springs 98 and 100. Beam springs 98 and 100 have a depth of 125 $\mu$m to 500 $\mu$m, depending on the desired operating characteristics of the microactuator, and have a width of about 2 $\mu$m.

Figure 18:
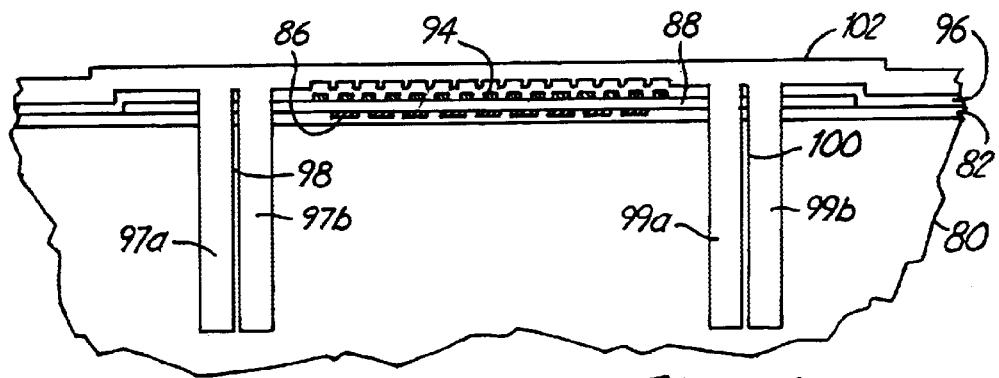
Figure 19:
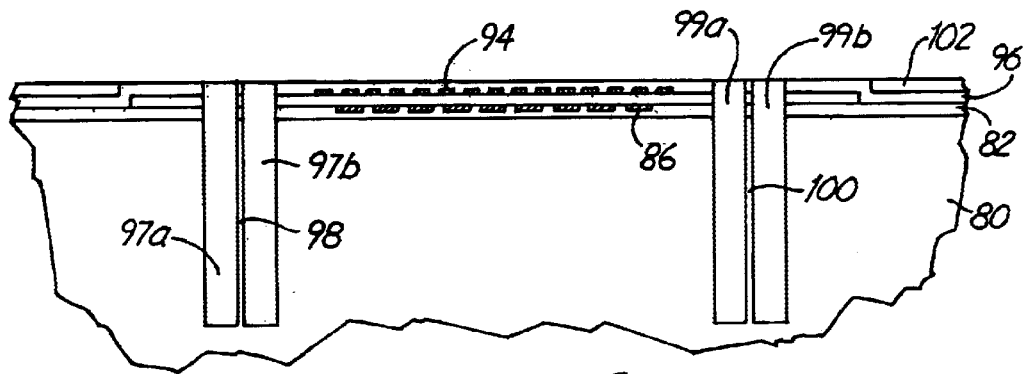
Figure 20:
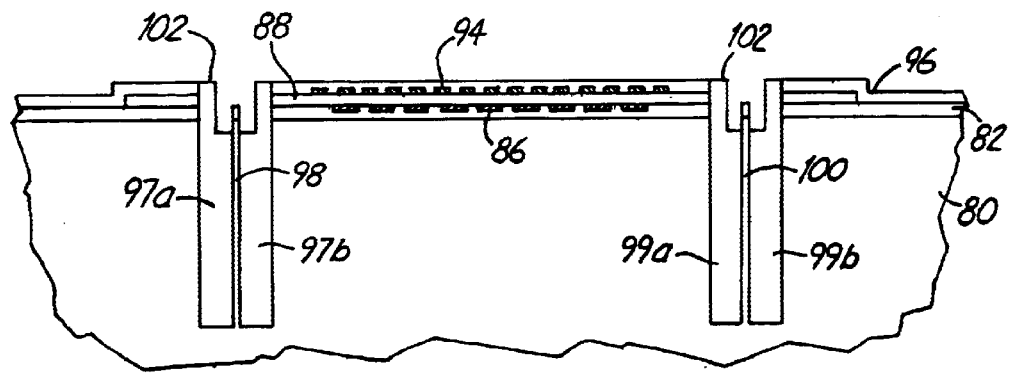

FIG. 18 is a section view illustrating sacrificial filler 102 deposited over insulating layer 96 and filling trenches 97*a*, 97*b*, 99*a* and 99*b*. Filler 102 constrains and protects beam springs 98 and 100 during subsequent processing of the microactuator. The top surface of the structure is then planarized as shown in FIG. 19 by a process known in the art such as lapping or CMIP, for example. The residual filler 102 on the outer portions of the structure is then removed, and the tips of beam springs 98 and 100 are exposed by removing a predetermined amount of insulating layer 96, spacer layer 88 and filler 102 around the tips of beams 98 and 100. The results of these steps are shown in FIG. 20. The removal of material to expose the tips of beam springs 98 and 100 may be performed by a high resolution etching process known in the art, such as ion milling, reactive ion etching (RIE), or wet etching, for example.

Figure 21:
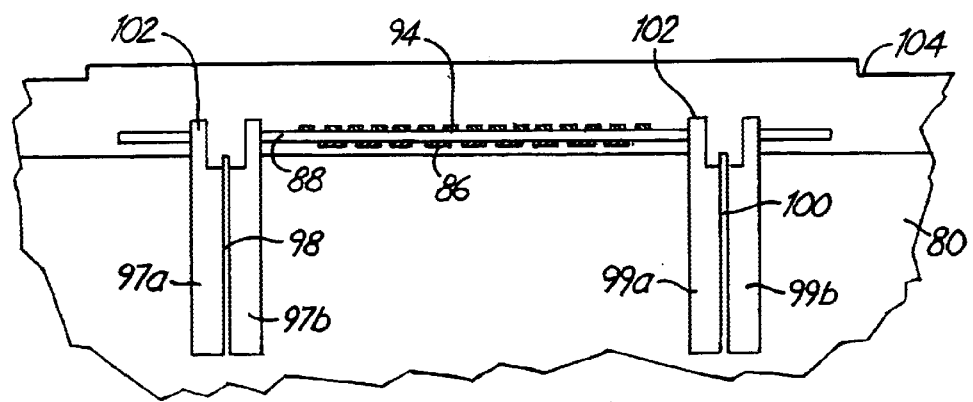
Figure 22:
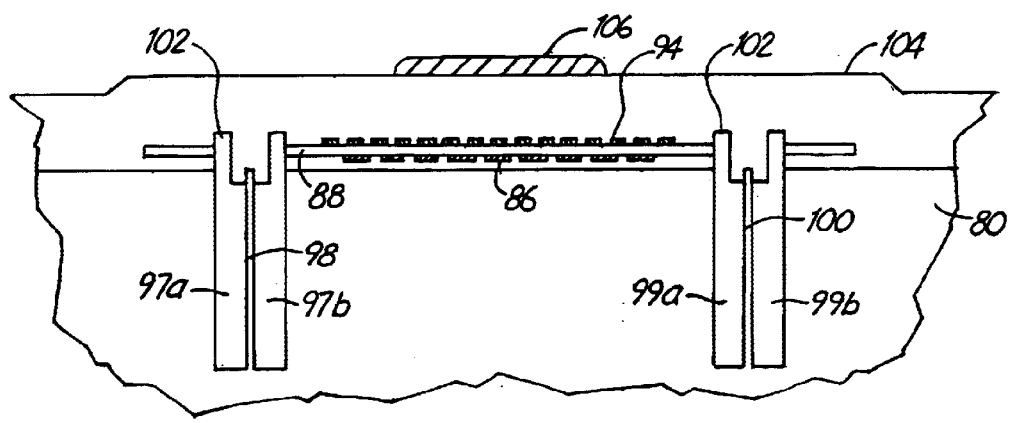
Figure 23:
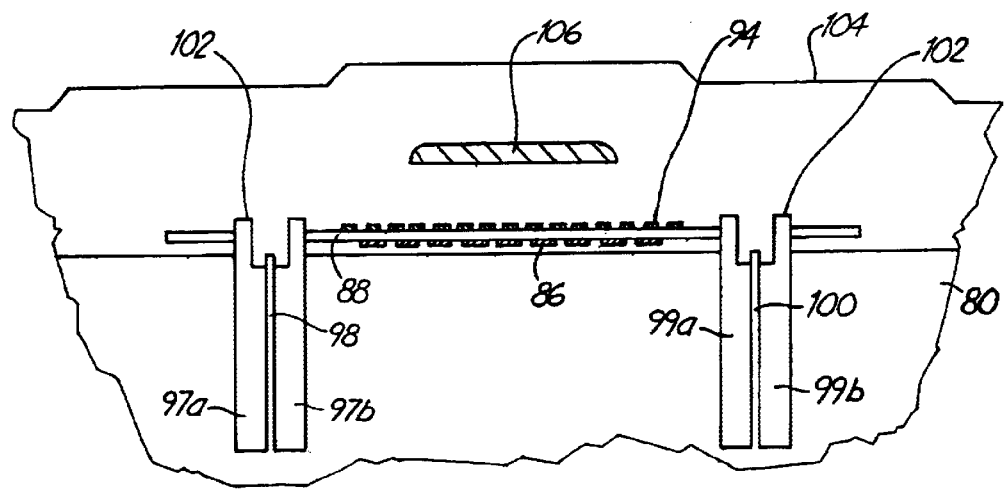

FIG. 21 is a section view illustrating rotor 104 deposited on the microactuator structure. For the sake of clarity, insulating layers 82 and 96 are no longer referred to individually, since they are contiguous with rotor 104 and are composed of the same or similar material as rotor 104. Rotor 104 mechanically engages the tips of beam springs 98 and 100 in the areas removed from filler 102. Transducing head 106 is then formed on rotor 104 in a manner known in the art, as shown in FIG. 22. An overcoating layer is then formed to encapsulate transducing head 106, formed of the same or similar material as rotor 104. This is shown in FIG. 23, with the overcoat and rotor simply referred to as rotor 104 for clarity, since they are contiguous and similar or identical in composition.

Figure 24:
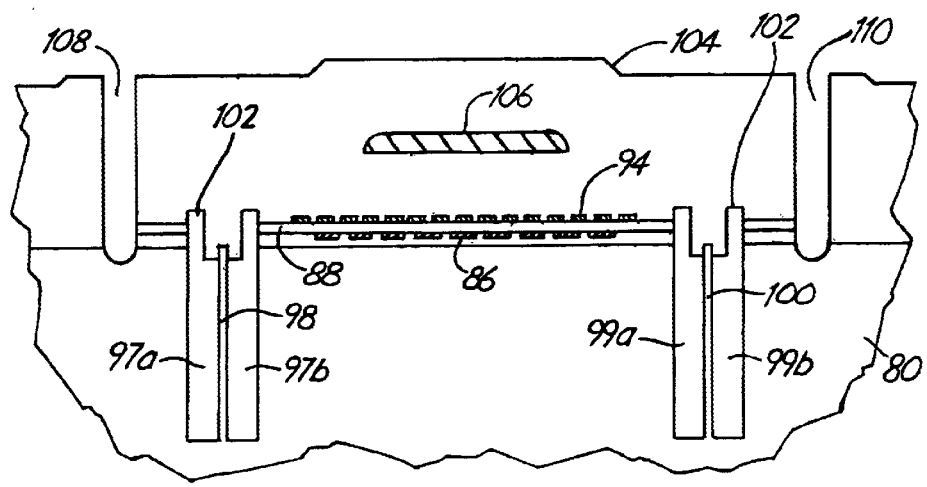
Figure 25:
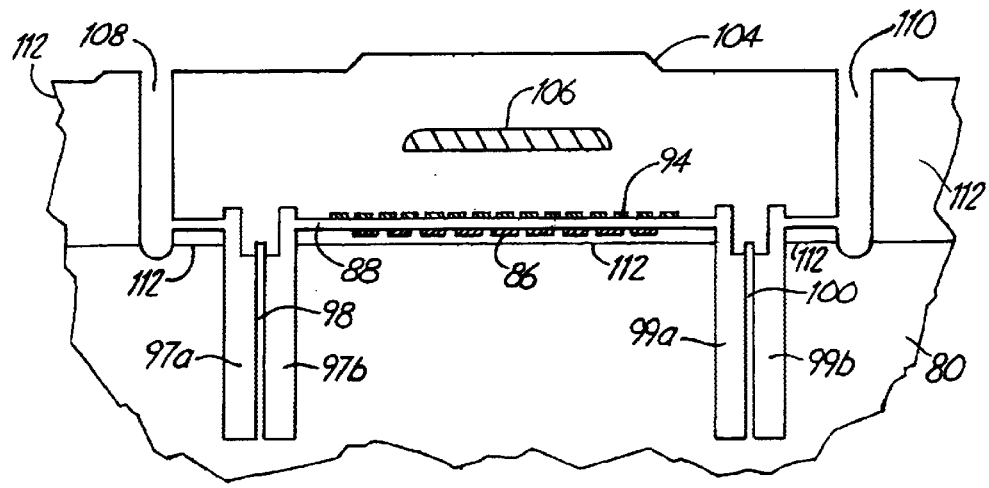

FIG. 24 is a section view illustrating trenches 108 and 110 formed through the outer portions of rotor 104 and substrate wafer 80. Trenches 108 and 110 are formed by etching, sawing, or a similar process known in the art, and serve to mechanically separate rotor 104 from the stator of the microactuator. This separation is more clearly shown in FIG. 25, which illustrates the removal of spacer layer 88 and trench filler 102 to free rotor 104 to move with respect to substrate wafer 80. These layers are preferably removed by an etching process known in the art. For the sake of clarity, the portions of insulating material that form the stator of the microactuator (attached to slider substrate wafer 80) are referred to as stator 112, while the portions of insulating material that form the rotor are referred to as rotor 104. The resulting structure is a completed microactuator, with rotor 104 being movable with respect to stator 112 through bending of beam springs 98 and 100, as generally described above with respect to FIGS. 3–6.

Figure 26:
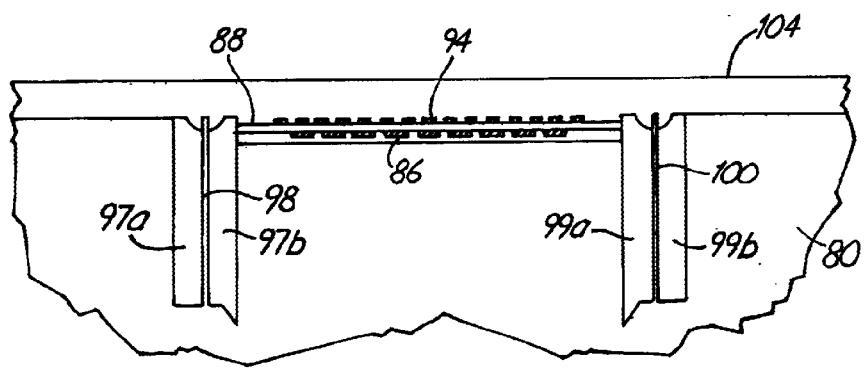
FIG. 26 is a section view illustrating a step of forming the slider and microactuator of the present invention according to an alternate embodiment.

In one modified embodiment of the process of fabricating the microactuator, stator electrodes 86 and rotor electrodes 94 are formed in a recessed tub etched in substrate wafer 80. This embodiment is shown in FIG. 26, which depicts the microactuator at the same stage of formation as is shown in FIG. 21. The modified embodiment eliminates the protruding central portion of rotor 104 caused by the presence of spacer layer 88 between stator electrodes 86 and rotor electrodes 94 by recessing those elements into a tub. The tub may be formed by an etching process known in the art. The remaining process steps shown in FIGS. 22–25 are performed in the same manner as before, to complete the fabrication of the microactuator.

Beam springs 98 and 100 are fabricated with dimensions determined by their desired spring constant, which is central to the design of the microactuator. In order to achieve a spring constant of about 45 N/m (which is a value desired in an exemplary embodiment of the microactuator), beam springs 98 and 100 are fabricated with a length of 250 $\mu$m, a depth of 250 $\mu$m, and a width of 2.06 $\mu$m, assuming an elastic modulus of 160 GPa for silicon. At 10 $\mu$m of lateral deflection, a stress of about 156 MPa is generated in beam springs 98 and 100 with such a design, which is readily handled by the beams. These dimensions of beam springs 98 and 100 may be formed by high resolution reactive ion etching (RIE), but the 2.06 $\mu$m width at an etch depth of 250 $\mu$m is near the resolution limit for this technology in its current state. In order to achieve a spring constant as low as 2.5 N/m (which is a value desired in another exemplary embodiment of the microactuator), the width of beam springs 98 and 100 must be reduced to 0.8 $\mu$m. These dimensions may be fabricated by potassium hydroxide (KOH) etching, for example, to achieve the higher aspect ratio required for the reduced beam thickness. Alternatively, it is expected that advancements in RIE processes will soon occur that enable the small beam thicknesses to be formed for a 250 $\mu$m or greater beam length.

A vertical load of one gram on rotor 104 (such as might be encountered by manual cleaning of the device with a cotton swab, for example) generates a stress of 58 MPa in the 2.06 $\mu$m wide beams, and 150 MPa in the 0.8 $\mu$m wide beams. These stresses are readily handled by the beams. In operation of the device in a disc drive, the actual vertical forces and stiction forces applied to rotor 104 are quite small, due to the relatively small area of rotor 104, and are easily borne by beam springs 98 and 100.

It should be understood that a number of possible designs of beam springs 98 and 100 may be utilized to support rotor 104 while allowing lateral movement of rotor 104 with respect to main slider substrate wafer 80. For example, a beam configuration is disclosed in U.S. Application No. 09/148,178, filed Sep. 14, 1998 and assigned to Seagate Technology, the same assignee as the instant application. The 09/148,178 application is hereby incorporated by reference. The beam design of the 09/148,178 application is fabricated by a deposition process rather than an etching process, using multiple narrow beams of silicon nitride or a similar material having favorable mechanical properties. Other designs consistent with the spirit and scope of the present invention will be apparent to those skilled in the art.

Electrostatic microactuators, such as the present invention, are generally considered to be more sensitive to contamination than magnetic microactuators. This is largely due to the much larger ratio of electrical conductivity between conductors and insulators compared to the ratio of permeability between magnetic and non-magnetic materials. For example, air has a relative magnetic permeability of 1, and permalloy (which is commonly used as the magnetic material in magnetic microactuators) has a maximum permeability of about 2000, for a ratio of $2\times10^3$. In an electrical circuit, the ratio between the conductivity of a conductor such as copper and an insulator such as fused quartz is on the order of $3\times10^{24}$. Normally this higher ratio is advantageous for electrical circuits, but since magnetic circuits are designed to operate with a significant amount of leakage, the small amount of additional leakage added by a small magnetic particle does not generally have a significant effect on the operation of the microactuator. The effect of a small magnetic particle is also limited by the fact that the magnetic particle saturates rather than conducting an arbitrarily high magnetic flux, so that if the area of the particle is small compared to the size of the magnetic gap, the magnetic effect will be minimal as well. By contrast, electrical conductors do not generally exhibit saturation effects, particularly at current densities below those that would vaporize the conductor, so that a small conductive particle across the gap between electrodes could completely disrupt the operation of the microactuator. While the inside of a disc drive is very clean in order to prevent head crashes, a certain number of small conductive particles may be present to contaminate the gap between the microactuator electrodes.

Figure 27:
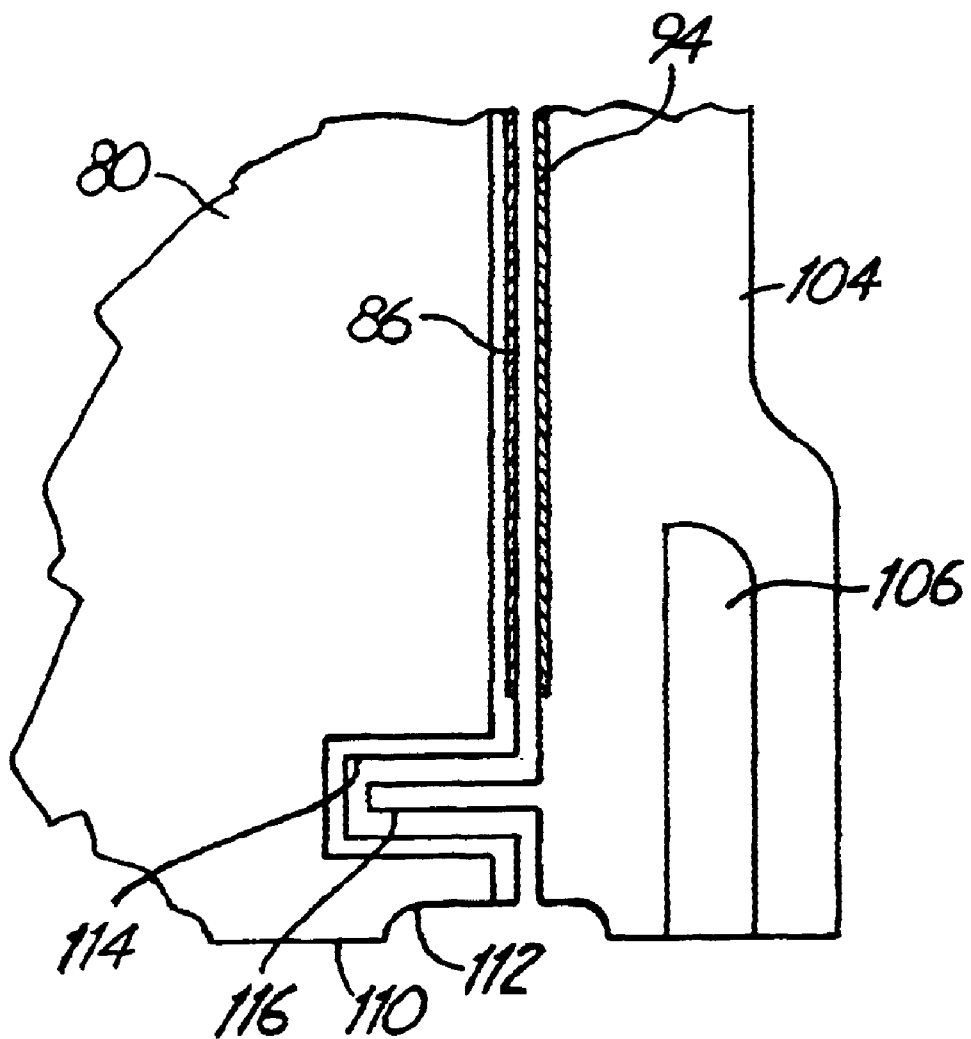
FIG. 27 is a side section view of the slider and microactuator of the present invention employing a labyrinth seal.

A number of measures are possible to prevent gap contamination. One possibility is to etch or saw a recess in the microactuator structure, so that the electrode gap does not extend all the way to the air-bearing, surface of the slider. A simple recess could be generated by the same ion milling process that forms the air-bearing surface of the slider. In addition, an even more effective labyrinth seal could be added during the process of fabricating the microactuator, Such as by an etching step just prior to depositing the electrode gap spacer layer. This step adds some topography to the wafer that can be dealt with by utilizing an electrode-posited photoresist for the subsequent step of rotor electrode metallization rather than a standard spun on photoresist. An embodiment employing this design is shown in FIG. 27, which illustrates a simplified side sectional view of the device. For the sake of clarity, the mechanical beams of the device are not shown, so that emphasis may be placed on the features of air-bearing surface 110 and of the labyrinth seal. Recess 112 is formed in air-bearing surface 110 of slider substrate wafer 80 and rotor 104. Recess 112 ensures that the gap between stator electrodes 86 and rotor electrodes 94 does not extend all the way to air-bearing surface 110. In addition, trench 114 is formed in slider substrate wafer 80 and column 116 is formed to extend from rotor 104, thereby forming a labyrinth seal that further protects the gap between stator electrodes 86 and rotor electrodes 94 from contamination.

Another possible measure for improving the resistance of the microactuator to electrode gap contamination is to introduce redundancy in the electrical circuit of the device. Specifically, a series resistor may be integrated between the drive voltage and each of the individual electrodes. Since the impedances of the electrodes are very high the resistor value may also be very high, on the order of 1 mega-ohm (MΩ). With this circuit configuration, a short circuit between any two electrodes due to the presence of a contaminating conductive particle will only affect a single set of electrodes, and will have very little effect on the overall operation of the microactuator.

A further possible measure for improving the resistance of the microactuator to electrode gap contamination is to coat the exposed surfaces of the electrodes with a thin insulating coating. If the coating is thin compared to the size of the gap between electrodes, the effect of the coating on the actuation force will be minimal. As a result, a small conductive particle in the gap will not disable any of the electrodes, but will merely short out the electric field in a volume of space on the order of the size of the particle itself, assuming that the insulating coating is able to withstand the driving voltage.

Electrical connections to the stator and the rotor of the microactuator can be made in a number of ways. For example, connection to the stator may be made from the top surface of the slider to a flex circuit connected to external drive circuitry, or alternatively the drive circuitry may be integrated on the slider itself. Electrical connection to the rotor, for both the microactuator and the transducing head, may be achieved in an exemplary embodiment by depositing an electrically conductive material in beams 98 and 100 connecting the rotor to the stator. The electrical interconnects will be quite thin, so as not to add excessive stiffness to the beams.

The present invention provides a microactuator for achieving high resolution head positioning in a disc drive with high frequency response and a relatively simple and inexpensive formation process. The high performance of the microactuator is achieved by moving only a small mass of the microactuator that includes the transducing head. As a result, the reaction force upon the suspension of the disc drive when actuating the microactuator is reduced by a factor of about 100 as compared to previous microactuator designs. This effectively eliminates any negative effects of suspension resonances due to actuation of the microactuator, which is highly desirable in a microactuator design. The mechanism for achieving microactuation in the present invention is fabricated in an essentially planar manner, with layers of material being formed on flat surfaces and features being etched in the material layers, as is well-known in the art.

Although the present invention has been described with reference to preferred embodiments, workers skilled in the art will recognize that changes may be made in form and detail without departing from the spirit and scope of the invention.

What is claimed is:

1. A microactuator for finely positioning a transducing head with respect to a track of a rotatable disc having a plurality of concentric tracks in a disc drive system, the disc drive system including a slider having a body carried by a flexure, the microactuator comprising:
   a stator portion extending from the body of the slider;
   a plurality of beams extending from the stator portion, the beams being flexible in a lateral direction;
   a rotor portion connected to the stator portion by the plurality of beams with a gap between the rotor portion and the stator portion, the rotor portion carrying the transducing head;
   a plurality of stator electrodes on the stator portion, the plurality of stator electrodes being alternately connected to a fixed high potential and a fixed low potential;
   a plurality of rotor electrodes on the rotor portion confronting the stator electrodes across the gap; and
   control circuitry for applying selected voltages to the rotor electrodes in a predetermined pattern to create a force in the lateral direction for moving the rotor portion with respect to the stator portion.

2. The microactuator of claim 1, wherein the control circuitry is operable to apply voltages to the plurality of rotor electrodes to generate the force in the lateral direction in a step-wise manner.

3. The microactuator of claim 1, wherein the control circuitry is operable to apply voltages to the plurality of rotor electrodes to generate the force in the lateral direction in a continuous manner.

4. The microactuator of claim 1, wherein the plurality of rotor electrodes are alternately connected to three terminals each having a voltage controlled by the control circuitry.

5. The microactuator of claim 4, wherein the predetermined pattern of voltages applied to the plurality of rotor electrodes by the control circuitry includes six phases.

6. The microactuator of claim 1, wherein the plurality of beams connecting the rotor portion to the stator portion have a length of about 250 micro-meters.

7. The microactuator of claim 1, wherein the plurality of beams connecting the rotor portion to the stator portion have a spring constant between 2.5 Newtons per meter and 45 Newtons per meter.

8. The microactuator of claim 1, further comprising a labyrinth seal protecting the gap between the rotor portion and stator portion from contamination.

9. The microactuator of claim 8, wherein the labyrinth seal comprises:
   a recess in the slider at an air-bearing surface of the slider around the gap between the rotor portion and the stator portion;
   a trench extending into the stator portion; and
   a column extending from the rotor portion into the trench.

10. The microactuator of claim 1, wherein each of the plurality of beams is composed of silicon.

11. The microactuator of claim 1, wherein an exposed surface of the rotor and stator electrodes is coated with a thin insulation coating.

12. The microactuator of claim 1, wherein the transducing head is encapsulated by an overcoating layer.

13. A microactuator for finely positioning a transducing head with respect to a track of a rotatable disc having a plurality of concentric tracks in a disc drive system, the disc drive system including a slider having a body carried by a flexure, the microactuator comprising:

a stator portion extending from the body of the slider;

a plurality of beams extending from the stator portion, the beams being flexible in a lateral direction;

a rotor portion connected to the stator portion by the plurality of beams with a gap between the rotor portion and the stator portion, the rotor portion carrying the transducing head;

a plurality of stator electrodes on the stator portion;

a plurality of rotor electrodes on the rotor portion confronting the stator electrodes in a normal direction across the gap; and control circuitry for applying selected voltages to the stator electrodes and the rotor electrodes to create a lateral force for moving the rotor portion in the lateral direction with respect to the stator portion.

14. The microactuator of claim 13, wherein the plurality of stator electrodes are alternately connected to a fixed high potential and a fixed low potential, and the control circuitry is operable to selectively apply voltages to the plurality of rotor electrodes in a predetermined pattern to generate the lateral force for moving the rotor portion in the lateral direction with respect to the stator portion.

15. The microactuator of claim 13, wherein the control circuitry is operable to apply voltages to the plurality of rotor electrodes to generate the lateral force in a step-wise manner.

16. The microactuator of claim 13, wherein the control circuitry is operable to apply voltages to the plurality of rotor electrodes to generate the lateral force in a continuous manner.

17. The microactuator of claim 13, wherein the plurality of rotor electrodes are alternately connected to three terminals each having a voltage controlled by the control circuitry.

18. The microactuator of claim 17, wherein the predetermined pattern of voltages applied to the plurality of rotor electrodes by the control circuitry includes six phases.

19. The microactuator of claim 13, further comprising a labyrinth seal protecting the gap between the rotor portion and stator portion from contamination.

20. The microactuator of claim 19, wherein the labyrinth seal comprises:

a recess in the slider at an air-bearing surface of the slider around the gap between the rotor portion and the stator portion;

a trench extending into the stator portion; and a column extending from the rotor portion into the trench.

* * * * *